Oct. 26, 1948.  W. SHIPPEE ET AL  2,452,330
FASTENER
Filed Jan. 1, 1945
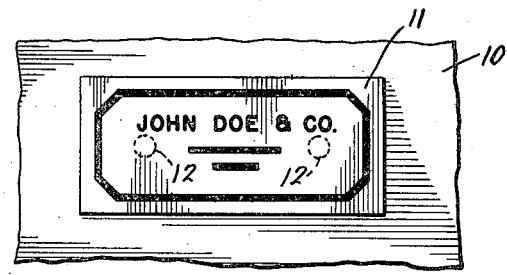
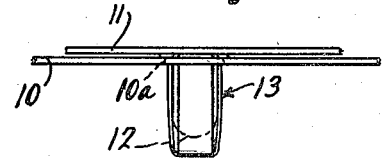
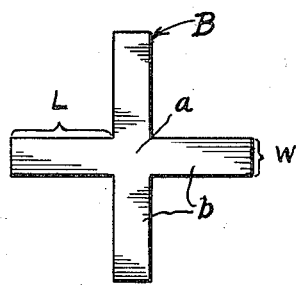
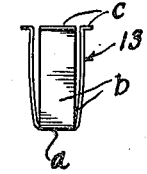
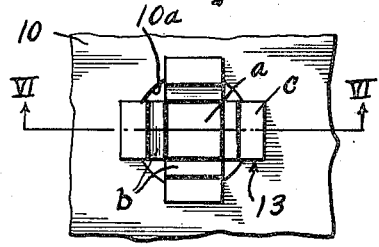
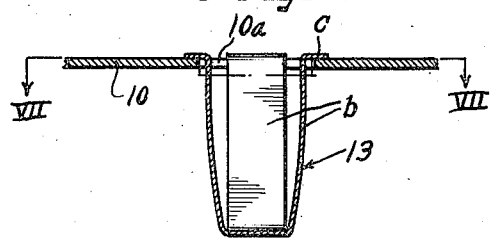
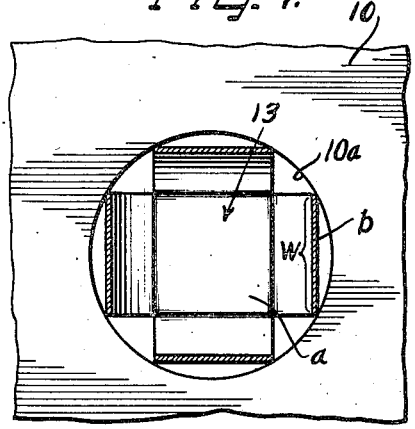
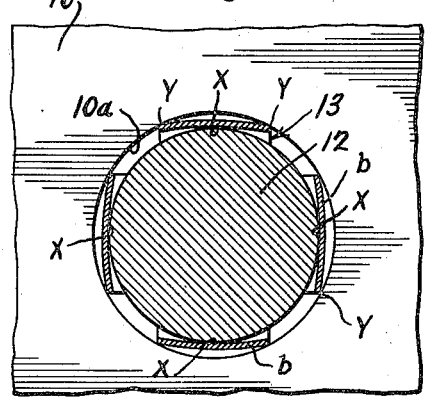
Inventors
WINSOR SHIPPEE
CARL C. SHIPPEE
by The Firm of Charles T. Hill Attys.

Patented Oct. 26, 1948

2,452,330

UNITED STATES PATENT OFFICE 2,452,330

FASTENER

Winsor Shippee and Carl C. Shippee,
Fair Haven, N. J.

Application January 1, 1945, Serial No. 570,865

6 Claims. (Cl. 85—5)

1

This invention relates to devices for fastening stems, pins or the like to thin-walled non-nailable material articles.

Specifically the invention deals with a spring metal clip adapted to be readily snapped through the aperture of a sheet metal wall for cooperating with the aperture to provide leaf springchords which are deflected upon the insertion of a pin or stud for tightly gripping the pin or stud in fixed relation with the wall.

In many metal, plastic, or other non-nailable material constructions, there is need for a fastener that can be seated in a hole of one part and receive a pin or stud of another part for securely locking the parts together. For example, in fastening name plates to sheet metal refrigerator cabinets, the name plate can be provided with one or more studs projecting from its rear face and the refrigerator cabinet can have holes therein for receiving these studs. However, since the cabinet wall is only a thin metal sheet, some fastening means must be used for fixedly connecting the name plate to the cabinet.

According to the present invention, an inexpensive metal clip is provided for fastening pins or studs to metal walls or the like. The clip is formed from a cross-shaped blank cut from a flat piece of metal. The blank has a square center part with legs extending outwardly from each side of the square. The blank is bent to form four ribbon-like or band-like legs extending upwardly from a square base. The legs are bowed between the base and the free ends thereof. These free ends are provided with outturned flanges. The clip will snap through a hole in a metal plate or the like and the bowed legs, in their free state, are sized so that the clip will not fall out of the hole. The flanges on the legs overlie the plate to prevent the clip from falling through the hole. Each leg has two-point contact with the wall of the hole and forms a chord in the hole. A pin or stud is forced into the socket defined by the legs and the base and is of such a diameter that it bows the legs across the width thereof thus deflecting the chord and causing the edges of the legs to dig into the wall defining the hole. Each leg thus becomes a spring anchored to the plate and tightly engaging the pin. The pin cannot be retracted from the socket except upon the application of great pulling force, nor can it be rotated relative to the sheet or plate except upon the application of great rotative force.

It is, then, an object of the present invention to provide a fastener capable of fixedly securing a metal stud or pin to a thin metal sheet.

2

A further object of the invention is to provide a clip adapted to be snapped into the aperture of a thin-walled member for defining a socket to receive a pin in such a manner that the pin is fixed relative to the thin-walled member.

A still further object of the invention is to provide a fastener composed of a base, a plurality of upstanding legs having appreciable width for forming chords in the aperture of an apertured member and capable of being deflected by the insertion of a pin or stud to fixedly grip both the pin and the aperture-defining wall for securing the pin in position.

A still further object of the invention is to provide an inexpensive spring metal clip composed of a square base, four integral upstanding ribbon-like legs having outturned flanges at their free ends, and bowed portions on said legs between the flanged ends and base.

A still further object of the invention is to provide a clip making possible the nailing together of metal studs and thin-walled metal plates.

Other and further objects of the invention will be apparent to those skilled in the art from the following detailed description of the annexed sheet of drawings which, by way of a preferred example only, illustrates one embodiment of the invention.

On the drawings:

Figure 1 is a fragmentary front plan view of a sheet metal wall carrying a name plate through fastener clips according to this invention.

Figure 2 is an end elevational view of the wall and name plate assembly of Figure 1 illustrating the clip of this invention.

Figure 3 is a plan view of a sheet metal blank from which the clips of this invention are formed.

Figure 4 is a side elevational view of a fastener clip according to this invention formed from the blank of Figure 3.

Figure 5 is a top plan view of a fastener clip of this invention snapped into a hole of a metal sheet or plate.

Figure 6 is a vertical cross-sectional view taken along the line VI—VI of Figure 5.

Figure 7 is an enlarged horizontal cross-sectional view, with parts in elevation, taken along the line VII—VII of Figure 6.

Figure 8 is a view similar to Figure 7 but illustrating the arrangement of the fastener clip after a pin or stud has been inserted in the socket of the clip.

As shown on the drawings:

In Figures 1 and 2 the reference numeral 10 designates a wall of thin sheet metal or the like such as a refrigerator cabinet wall. This wall 10 has an aperture 10a therein and carries in fixed relation thereon a name plate 11 equipped with rearwardly projecting studs 12 and 12'. These studs are held in fixed relation to the plate 10 by means of fastener clips 13 according to this invention.

As shown in Figure 3, the fastener clips of this invention are formed from a cross-shaped metal blank B having a square center part $a$ and legs $b$ radiating from each side of the center part $a$. Each leg $b$ has an appreciable width W and a length L for cooperating to define a socket to receive the stud 12 of the name plate 11.

As shown in Figure 4, the clip 13 of this invention is formed from the blank B by bending the legs $b$ upwardly from the base $a$ and by turning out flanges $c$ on the free ends of the legs $b$. The legs $b$ are bowed between the base $a$ and the flanges $c$ to provide a peripheral contour slightly larger than the diameter of the plate hole 10a so that the clip can be snapped through the hole 10a with the bowed portions of the legs expanded behind the plate to a size greater than the size of the hole, and with the flanges $c$ of the legs bottomed on the front face of the plate as shown in Figures 5 and 6.

With the clip 13 in position in the plate 10, each leg $b$ is sufficiently wide so that it forms a chord in the aperture 10a of the plate as shown in Figure 7. Each chord contacts the aperture-defining wall at the side edges of each leg. Thus each leg contacts the aperture-defining wall at two spaced areas and, since four legs are provided, the clip has eight points engaging the aperture-defining wall of the plate.

The mid-portions of each leg $b$ are spaced inwardly from the aperture-defining wall of the plate.

The stud 12 of the name plate 11 has a cylindrical side wall of a diameter smaller than the aperture 10a of the plate 10 but larger than a circle that can fit freely within the socket defined by the clip 13.

When a stud 12 is inserted in the clip 13 as shown in Figure 8, the middle portion of each leg $b$ is engaged by the stud 12 and is deflected toward the wall of the aperture 10a. The stud 12 thus engages the clip at four points $x$ and each point $x$ is mid-way between the side edges of the legs. The pin bows the legs $b$ across the width thereof and causes the side edges of the legs to bite into the wall defining the aperture 10a as at $y$. The pin thus engages the clip 13 at four areas while the clip engages the plate 10 at eight areas.

Each leg $b$ of the clip acts as a leaf spring chord in the aperture 10a and deflection of this spring chord by insertion of the stud in the socket of the clip creates a wedge-like condition causing the clip to tightly grip both the stud and the plate. As a result, the stud is fixedly held by the plate through the spring clips and the parts are effectively nailed together.

The clips of this invention are inexpensively formed from sheet metal and are preferably made of spring metal. They are easily snapped into the apertures of metal plates or the like and easily receive pins, studs or the like to be attached to the plates. The pins or studs are merely pushed into the sockets defined by the clips and are held against rotation and against retraction.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a mounting for attaching a stem or pin to an apertured wall, a clip having a plurality of angularly edged band-like legs adapted to form leaf-spring chords in the aperture of said wall engaging the aperture-defining surface of the wall at the side edges thereof, and said legs cooperating to define a socket substantially as long as said legs for receiving a stem of a diameter sufficient to deflect said legs outwardly, forcing said annular edges in said aperture into gripping engagement with said aperture-defining surface.

2. A fastener for use in a circular hole comprising a member having a base, four upstanding longitudinally-bowed band-like legs on said base, said legs defining a socket of square cross section substantially as long as said legs and being of sufficient width to form leaf-spring chords in the hole with the free edges only of the legs engaging the periphery of said aperture, said socket being adapted to be expanded outwardly by insertion of a pin therein of a size producing transverse bowing of the leaf-spring chords into gripping engagement with the circular hole.

3. In a mounting for attaching a stem to an apertured thin-walled member, a spring metal clip having a base with a plurality of upstanding band-like legs, the free ends of said legs being constructed and arranged to engage the aperture-defining surface of the thin-walled member in chordal relation, forming a continuous, socket-like receptacle substantially as long as said legs and means to deflect said free ends into gripping engagement with the aperture-defining surface.

4. A fastener for securing a pin to an apertured thin wall which comprises a spring clip having a base with a plurality of upstanding band like legs spaced around the periphery thereof, an outturned flange on the free end of each leg for overlying the wall around the aperture thereof to limit the extent of insertion of the legs in the aperture, said legs being outwardly bowed intermediate between the flanges and base to yieldingly retain the legs in the aperture, the portions of the legs adjacent the flanges having linear outer edges having a line engagement with the aperture defining wall whereby said leg portions lie in chord-like relation in the aperture, said legs being adapted to be transversely, outwardly bowed upon insertion of the pin therebetween.

5. In combination with an apertured wall, a spring metal clip having a plurality of band-like legs peripherally disposed to define a socket, one end of said socket being insertable in said aperture in the wall with each of said legs engaging the aperture-defining wall in chordal relation, and a pin insertable in said socket in expanding relationship thereto, said pin having a diameter less than said aperture but greater than the diameter of the inscribed circle defined by the chordal portions of said legs to transversely bow said legs toward said wall, whereby said legs frictionally grip both said pin and said aperture-defining wall.

6. In combination with an apertured member, a spring metal clip having a base with a plurality of integrally formed, upstanding band-like legs defining a socket, the free ends of said legs being constructed and arranged to engage the aperture in chordal relationship, and a pin insertable in said socket in expanding relationship thereto, said pin having a diameter less than said aperture but sufficiently large to transversely bow said legs toward said apertured wall, whereby said legs frictionally grip both said pin and said apertured wall.

WINSOR SHIPPEE.
CARL C. SHIPPEE.

REFERENCES CITED

The following references are of record in the file of this patent:

UNITED STATES PATENTS

| Number | Name | Date |
|---|---|---|
| 436,308 | Diss | Sept. 9, 1890 |
| 788,532 | Higgin | May 2, 1905 |
| 845,473 | Murphy | Feb. 26, 1907 |
| 2,194,855 | Jones | Mar. 26, 1940 |
| 2,336,153 | Ryder | Dec. 7, 1943 |

FOREIGN PATENTS

| Number | Country | Date |
|---|---|---|
| 521,276 | Great Britain | May 16, 1940 |